US010352384B2

(12) United States Patent
Satoh et al.

(10) Patent No.: US 10,352,384 B2
(45) Date of Patent: Jul. 16, 2019

(54) DISC BRAKE DEVICE FOR A VEHICLE (71) Applicant: NISSIN KOGYO CO., LTD., Tomi, Nagano (JP)

(72) Inventors: Hiromasa Satoh, Tomi (JP); Takashi Ono, Tomi (JP)

(73) Assignee: Nissin Kogyo Co., Ltd., Nagano (JP)

( * ) Notice: Subject to any disclaimer, the term of this patent is extended or adjusted under 35 U.S.C. 154(b) by 0 days.

(21) Appl. No.: 15/564,961

(22) PCT Filed: Apr. 21, 2016

(86) PCT No.: PCT/JP2016/062628
§ 371 (c)(1),
(2) Date: Oct. 6, 2017

(87) PCT Pub. No.: WO2016/171210
PCT Pub. Date: Oct. 27, 2016

(65) Prior Publication Data
US 2018/0094682 A1  Apr. 5, 2018

(30) Foreign Application Priority Data

Apr. 24, 2015  (JP) ................. 2015-088941

(51) Int. Cl.
*F16D 65/18* (2006.01)
*F16D 121/04* (2012.01)
(Continued)

(52) U.S. Cl.
CPC ........... *F16D 65/18* (2013.01); *F16D 65/092* (2013.01); *F16D 65/095* (2013.01);
(Continued)

(58) Field of Classification Search
CPC .... F16D 65/18; F16D 2121/10; F16D 65/095; F16D 65/092; F16D 65/0971; F16D 2121/04; F16D 2121/24
(Continued)

(56) References Cited

U.S. PATENT DOCUMENTS 5,509,508 A * 4/1996 Evans ................. F16D 65/0006
188/73.31
5,842,546 A * 12/1998 Biswas ............... F16D 65/0006
188/73.37
(Continued)

FOREIGN PATENT DOCUMENTS

| CN | 1285088 A | 2/2001 |
|---|---|---|
| CN | 1376242 A | 10/2002 |

(Continued)

OTHER PUBLICATIONS

Official Communication dated Oct. 12, 2018, issued in the corresponding Chinese patent application No. 201680023490.4.
(Continued)

*Primary Examiner* — Pamela Rodriguez
(74) *Attorney, Agent, or Firm* — Carrier Blackman & Associates, P.C.; Joseph P. Carrier; Fulchand P. Shende (57) ABSTRACT

A disc brake device for a vehicle, the disc brake device is equipped with: a piston slidably fitted into a cylinder hole provided in one arm section of a brake caliper, and capable of pressing against one friction pad; a shim plate mounted on a back plate of the one friction pad and interposed between the back plate and the piston; and a pressing device that applies pressing force to the piston while causing rotational force to act on the piston. Multiple protrusions protruding toward the piston are provided, with intervals between the protrusions, on the back plate of the friction pad facing the piston with the shim plate therebetween, and multiple engaging holes, into which the multiple protrusions are (Continued)

fitted, are provided on the shim plate so as to prevent the shim plate from rotating together with the piston due to the rotational force.

9 Claims, 7 Drawing Sheets

(51) Int. Cl.
    *F16D 121/10*     (2012.01)
    *F16D 121/24*     (2012.01)
    *F16D 65/092*     (2006.01)
    *F16D 65/095*     (2006.01)
    *F16D 65/097*     (2006.01)

(52) U.S. Cl.
    CPC ...... F16D 65/0971 (2013.01); *F16D 2121/04* (2013.01); *F16D 2121/10* (2013.01); *F16D 2121/24* (2013.01)

(58) Field of Classification Search
    USPC ......... 188/250 E, 250 G, 250 B, 73.1, 73.36, 188/73.37
    See application file for complete search history.

(56) References Cited

U.S. PATENT DOCUMENTS

| | | | |
|---|---|---|---|
| 6,116,384 A * | 9/2000 | Matsumoto | F16D 65/0006 188/250 D |
| 6,367,592 B1 | 4/2002 | Kapaan et al. | |
| 6,607,059 B1 | 8/2003 | Kapaan et al. | |
| 6,913,120 B2 * | 7/2005 | Bosco | F16D 65/092 188/250 E |
| 8,225,911 B2 * | 7/2012 | Lin | F16D 65/092 188/250 E |
| 10,041,554 B2 | 8/2018 | Ishikawa et al. | |
| 2004/0035651 A1 | 2/2004 | Renauld | |
| 2005/0067235 A1 * | 3/2005 | Pham | F16D 65/0006 188/250 B |

FOREIGN PATENT DOCUMENTS

| | | |
|---|---|---|
| JP | 358211032 A * | 12/1983 |
| JP | S61-166241 U | 10/1986 |
| JP | H03-118328 U | 12/1991 |
| JP | H06-30541 U | 4/1994 |
| JP | H07-022502 Y2 | 5/1995 |
| JP | H09-144783 A | 6/1997 |
| JP | 2003-083373 A | 3/2003 |
| JP | 2013-160272 A | 8/2013 |
| JP | 2015-232341 A | 12/2015 |

OTHER PUBLICATIONS

Official Communication, Notice of Reasons for Refusal, issued over a corresponding Japanese Patent Application No. 2017-514183, dated Mar. 6, 2019, and the English translation thereof.

* cited by examiner

DISC BRAKE DEVICE FOR A VEHICLE

TECHNICAL FIELD

The invention relates to a disc brake device for a vehicle and, particularly to, a disc brake device including a brake disc, a pair of friction pads facing each other with the brake disc sandwiched therebetween, a brake caliper that has a pair of arm sections disposed on the back sides of the friction pads and is slidably supported by a fixed bracket, a piston that is slidably fitted into a cylinder hole provided in one of the arm sections of the brake caliper and is capable of pressing one of the friction pads, a shim plate that is attached to the back plate of the one of the friction pads and is present between the back plate and the piston, and pressing means capable of giving a pressing force to the piston.

BACKGROUND ART

Conventionally, as illustrated in, for example, PTL 1 below, there is a known disc brake device including pressing means (cam pressing mechanism for a parking brake) for mechanically giving a pressing force via an operation by an occupant in addition to a hydraulic mechanism for giving a pressing force to a piston via a hydraulic pressure.

The conventional device has a single protrusion to be fitted to the front surface of the piston on the back plate of friction pads to prevent the piston from being rotated using the friction pads and an engaging hole into which the protrusion is fitted is provided in the shim plate to prevent the shim plate as well as the piston from being rotated.

PRIOR ART DOCUMENT

Patent Literature

Japanese Utility Model Publication No. 7-22502

SUMMARY OF INVENTION

Problems to be Solved by the Invention

In the conventional device, since an especially large rotational force is not applied to the piston when the pressing means operates, even when there is only one piston rotation prevention protrusion on the back plate of the friction pads, it is sufficient to prevent the shim plate from being rotated.

However, when such a rotation prevention structure of the conventional device is applied as is to pressing means (for example, a disc brake device using, for example, an electric actuator) capable of giving a pressing force while applying a rotational force to the piston, since the electric actuator applies a large rotational force to the piston when pressurization is activated, the following problems occur.

That is, when a large rotational force is applied to the piston as pressurization by the electric actuator is activated, the piston tries to rotate within the range of engagement play between the piston and the pad back plate and the rotational force is transferred to the shim plate in close contact with the front surface of the piston and tries to rotate the shim plate strongly. However, when only one protrusion is fitted into one engaging hole as described above, the rotation of the shim plate is not restricted surely and the shim plate rotates. In this case, an excessive load is applied to the claw or the like for locking the shim plate to the friction pad back plate, thereby causing problems such as reduction in the durability of the shim plate.

The invention addresses such situations with an object of providing a disc brake device for a vehicle capable of solving the above problems.

Means for Solving the Problems

To achieve the above object, in the first aspect of the invention, a disc brake device for a vehicle includes a brake disc, a pair of friction pads having the brake disc facing each other with the brake disc sandwiched therebetween, a brake caliper that has a pair of arm sections disposed on the back sides of the friction pads and is slidably supported by a fixed bracket, a piston that is slidably fitted into a cylinder hole provided in one of the arm sections of the brake caliper and is capable of pressing one of the friction pads, a shim plate that is attached to the back plate of the one of the friction pads and is present between the back plate and the piston, and pressing means capable of giving a pressing force to the piston while applying a rotational force to the piston, in which the back plate of the friction pad facing the piston with the shim plate sandwiched therebetween is provided with a plurality of protrusions protruding toward the piston, the protrusions being spaced apart from each other, and in which the shim plate is provided with a plurality of engaging holes into which the plurality of protrusions is fitted to prevent the shim plate from being co-rotated with the piston by the rotational force.

In the second aspect of the invention, in the disc brake device for a vehicle in addition to the first aspect, the shim plate extends to one side and the other side in a circumferential direction of the brake disc from the cylinder hole as seen from a projection plane orthogonal to a rotational shaft line of the brake disc and at least one of the engaging holes and at least the other of the engaging holes are disposed separately on one side and the other side in the circumferential direction of the brake disc as seen from the projection plane with the cylinder hole sandwiched therebetween.

In the third aspect of the invention, in the disc brake device for a vehicle in addition to the second aspect, the at least one of the engaging holes is formed in a long hole having a longer axis along a straight line connecting an axial line of the cylinder hole and the protrusions as seen from the projection plane and the inner diameter along a shorter axis of the long hole is substantially the same length as the outer diameter of the protrusions to be fitted into the long holes.

In the fourth aspect of the invention, in the disc brake device for a vehicle in addition to the second aspect or the third aspect, the at least one of the engaging holes is formed in an end part on the one side in the circumferential direction of the brake disc in the shim plate and the at least the other of the engaging holes is formed in an end part on the other side in the circumferential direction of the brake disc in the shim plate.

In the fifth aspect of the invention, in the disc brake device for a vehicle in addition to the first aspect, the at least one of the engaging holes and at least the other of the engaging holes are disposed on one side and the other side, respectively, in one diameter line of the cylinder hole with the cylinder hole sandwiched therebetween as seen from a projection plane orthogonal to a rotational shaft line of the brake disc.

In the sixth aspect of the invention, in the disc brake device for a vehicle in addition to the fifth aspect, at least one of the engaging holes is formed in a long hole having a longer axis along the one diameter line and the inner diameter along a shorter axis of the long hole is substantially the same length as the outer diameter of the protrusions to be fitted to the long holes.

In the seventh aspect of the invention, in the disc brake device for a vehicle in addition to any one of the first to sixth aspects, the pressing means is an electric actuator capable of generating a driving force when energized and a hydraulic chamber to which a hydraulic pressure capable of pressurizing the piston independently from the electric actuator is introducible is defined on a back surface of the piston in the cylinder hole.

In the eight aspect of the invention, in the disc brake device for a vehicle in addition to the first aspect, a locking claw to be elastically locked to a corresponding side edge part of the back plate are provided integrally in one of a side edge part on a radial inside and a side edge part on a radial outside of the brake disc of the shim plate.

In the third aspect and the sixth aspect of the invention and this specification, "the inner diameter along the shorter axis of the long hole is substantially the same length as the outer diameter of the protrusion to be fitted into the long hole" includes the case in which the inner diameter accurately equals the outer diameter as well as the case in which the inner diameter is slightly larger than the outer diameter (that is, the play of the engaging part is slightly larger to the extent to which the play has no influence on the achievement of the effects of the invention.

Effects of the Invention

According to the first aspect of the invention, in the disc brake device for a vehicle including the shim plate present between the back plate of the friction pad and the piston and the pressing means capable of giving a pressing force to the piston while applying a rotational force to the piston, the back plate of the friction pad facing the piston with the shim plate sandwiched therebetween is provided with a plurality of protrusions protruding toward the piston, the protrusions being spaced apart from each other and the shim plate is provided with a plurality of engaging holes into which the plurality of protrusions is fitted to prevent the shim plate from being co-rotated with the piston by the rotational force. Accordingly, even when a large rotational force is applied to the piston as pressurization by the electric actuator is activated, it is possible to surely prevent the shim plate from being co-rotated (from being relatively rotated with respect to the friction pad) by engagement of a plurality of pairs of a protrusion and an engaging hole. This reduces loads on individual components (for example, the locking part locking to the friction pads) of the shim plate and contributes to the improvement of the durability of the shim plate.

Particularly, according to the second aspect, the shim plate extends to one side and the other side in a circumferential direction of the brake disc from the cylinder hole as seen from a projection plane orthogonal to a rotational shaft line of the brake disc and at least one of the engaging holes and at least the other of the engaging holes are disposed on one side and the other side in the circumferential direction of the brake disc as seen from the projection plane with the cylinder hole sandwiched therebetween. Accordingly, the plurality of engaging holes (therefore, the plurality of protrusions) can be disposed using the extending region of the sim plate extending toward both sides of the cylinder hole in the circumferential direction of the brake disc at relatively high flexibility and the plurality of protrusions can be fitted into the plurality of engaging holes in positions separated in the disc circumferential direction from the axial line of the cylinder hole, thereby effectively preventing the shim plate from being co-rotated with the piston.

Particularly, according to the third aspect, since the engaging holes are formed in long holes having longer axes along a straight line connecting the axial line of the cylinder hole and the protrusions as seen from the projection plane and the inner diameter along shorter axes of the long holes is substantially the same length as the outer diameter of the protrusions, it is possible to prevent the shim plate from being co-rotated by fitting the protrusions into the engaging holes formed in long holes and affordably absorb the tolerance in the dimensions of the friction pad back plate and the shim plate in the same direction, thereby accurately enabling assembly work.

Particularly, according to the fourth aspect, since the at least one of the engaging holes is formed in an end part on the one side in the circumferential direction of the brake disc in the shim plate and at least the other of the engaging holes is formed in an end part on the other side in the circumferential direction of the brake disc in the shim plate, the engaging holes (therefore, the protrusions) can be disposed in both end parts in the disc circumferential direction of the shim plate sufficiently separated from the axial line of the cylinder hole, thereby more effectively preventing the shim plate from being co-rotated.

Particularly, according to the fifth aspect, since at least one of the engaging holes and at least other of the engaging holes are disposed on one side and the other side, respectively, in one diameter line of the cylinder hole with the cylinder hole sandwiched therebetween as seen from a projection plane orthogonal to the rotational shaft line of the brake disc, the protrusions can be fitted into the engaging holes in positions radially separated from the axial line of the cylinder hole on one side and the other side with the cylinder hole sandwiched therebetween, thereby effectively preventing the shim plate from being co-rotated.

Particularly, according to the sixth aspect, since the engaging holes are formed in long holes having longer axes along the one diameter line and the inner diameter along shorter axes of the long holes is substantially the same length as the outer diameter of the protrusions, it is possible to affordably absorb the tolerance in the dimensions of the friction pad back plate and the shim plate in the same direction by relatively sliding the protrusions in the longitudinal direction of the long holes while preventing the shim plate from being co-rotated by fitting the protrusions into the engaging holes formed of long holes, thereby accurately enabling assembly work.

Particularly, according to the seventh aspect, since the pressing means is an electric actuator capable of generating a driving force when energized and, even if a large rotational force is applied to the piston when pressurization by the electric actuator is activated, surely makes restriction by fitting a plurality of pairs of a protrusion and an engaging hole, so durability can be improved by effectively preventing the shim plate from being co-rotated with the piston.

Particularly, according to the eighth aspect, since a locking claw to be locked to a corresponding side edge part of the back plate is provided integrally in one of a side edge part on a radial inside and a side edge part on a radial outside of the brake disc of the shim plate in the radial direction and the locking claw makes contact with and is locked to the back plate elastically, the strength for retaining the shim plate to the back plate can be increased so that deformation or drop of the shim plate can be effectively prevented and the number of locking claws can be minimized, thereby improving yields during molding of the shim plate and reducing the cost.

REFERENCE SIGNS LIST

A: electric actuator as pressing means
B: brake bracket as bracket
C: brake caliper
Ca: first arm section as one arm section
Ca': second arm section as arm section
Ch: cylinder hole
D: brake disc
P: first friction pad as one friction pad
P': second friction pad as friction pad
PI: piston
S: shim plate
Sma, Smb: upper locking claw as locking claw
Smc: lower locking claw as locking claw
h2, h2': second engaging hole as engaging hole
t2, t2': second protrusion as protrusion
4: back plate
8: fluid-hydraulic chamber as hydraulic chamber

MODES FOR CARRYING OUT THE INVENTION

Embodiments of the invention will be described on the basis of an example of the invention illustrated in the attached drawings.

First Embodiment

First, in FIGS. 1 to 7, the disc brake device for a vehicle according to the invention can obtain a service brake state by a hydraulic pressure and can obtain a parking brake state by a driving force of an electric motor M and includes a brake disc D rotating integrally with the hubcap of a wheel (not illustrated), a brake caliper C, and a pair of friction pads P and P', present between the brake disc D and the brake caliper C, that faces each other with the brake disc D sandwiched therebetween.

Figure 1:
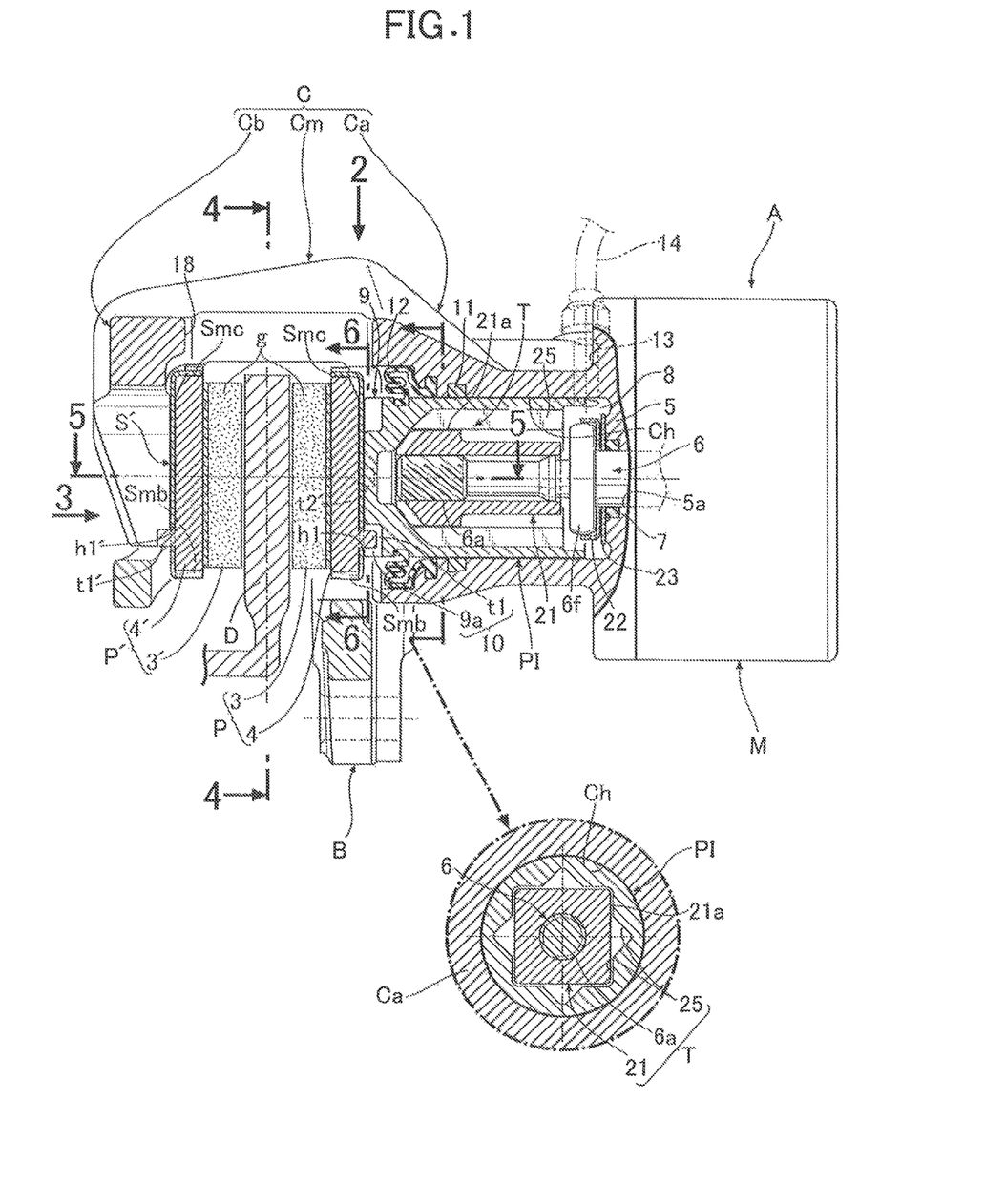
FIG. 1 is a vertical cross sectional view illustrating the main part of a disc brake device for a vehicle according to an embodiment of the invention. (First embodiment)

The brake caliper C integrally includes a first arm section Ca, disposed so as to straddle the brake disc D, that is supported by the brake bracket B fixed to the vehicle body so as to be slidable in the direction along the axial line (that is, the axial line of the axle) of the brake disc D, an intermediate bridge part Cm extending from the first arm section Ca to the opposite side by straddling the brake disc D, and a second arm section Cb vertically provided at the extending end of the intermediate bridge part Cm.

Figure 2:
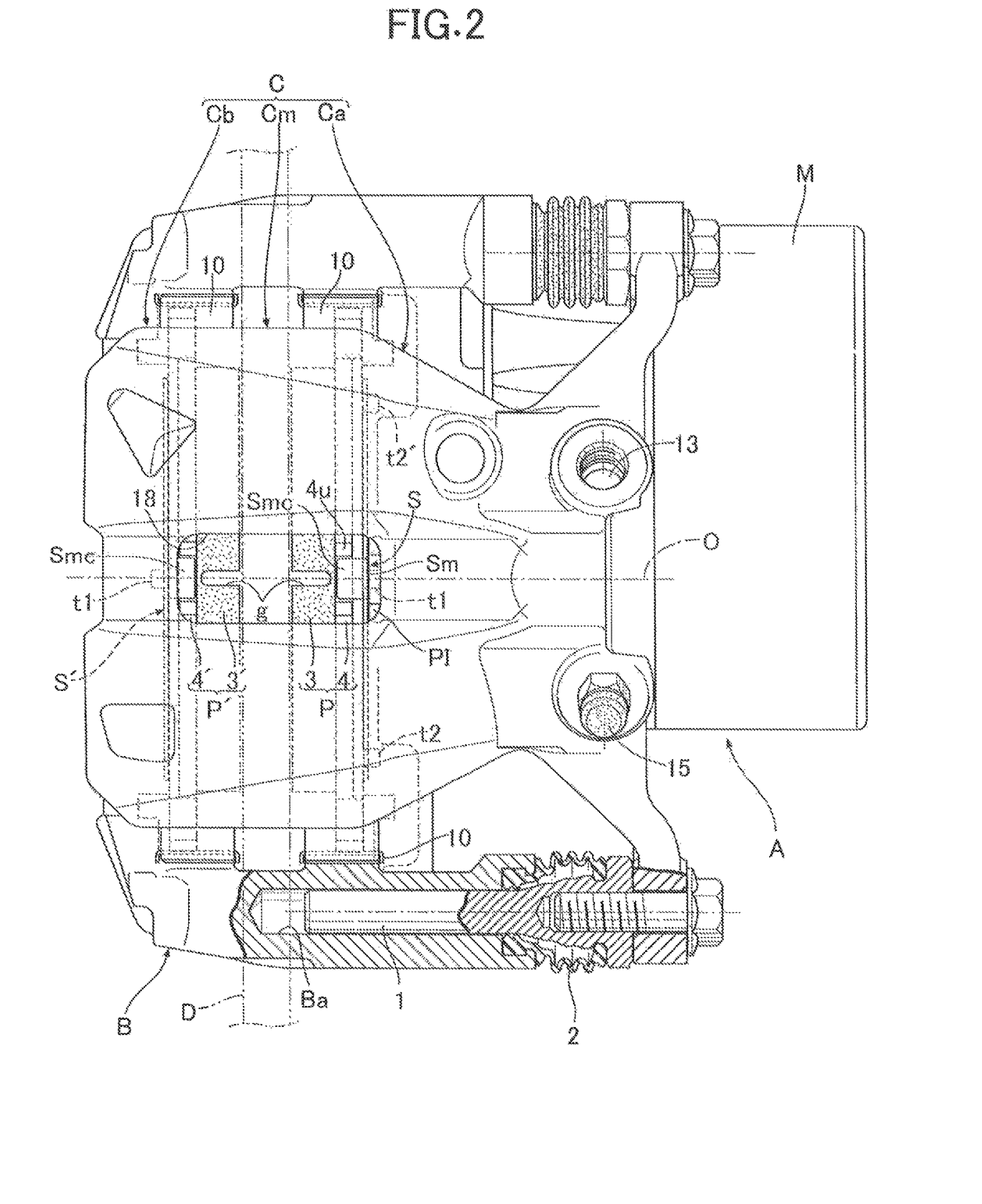
FIG. 2 is a partially-broken plan view illustrating the disc brake device (seen from arrow 2 in FIG. 1). (First embodiment)
Figure 3:
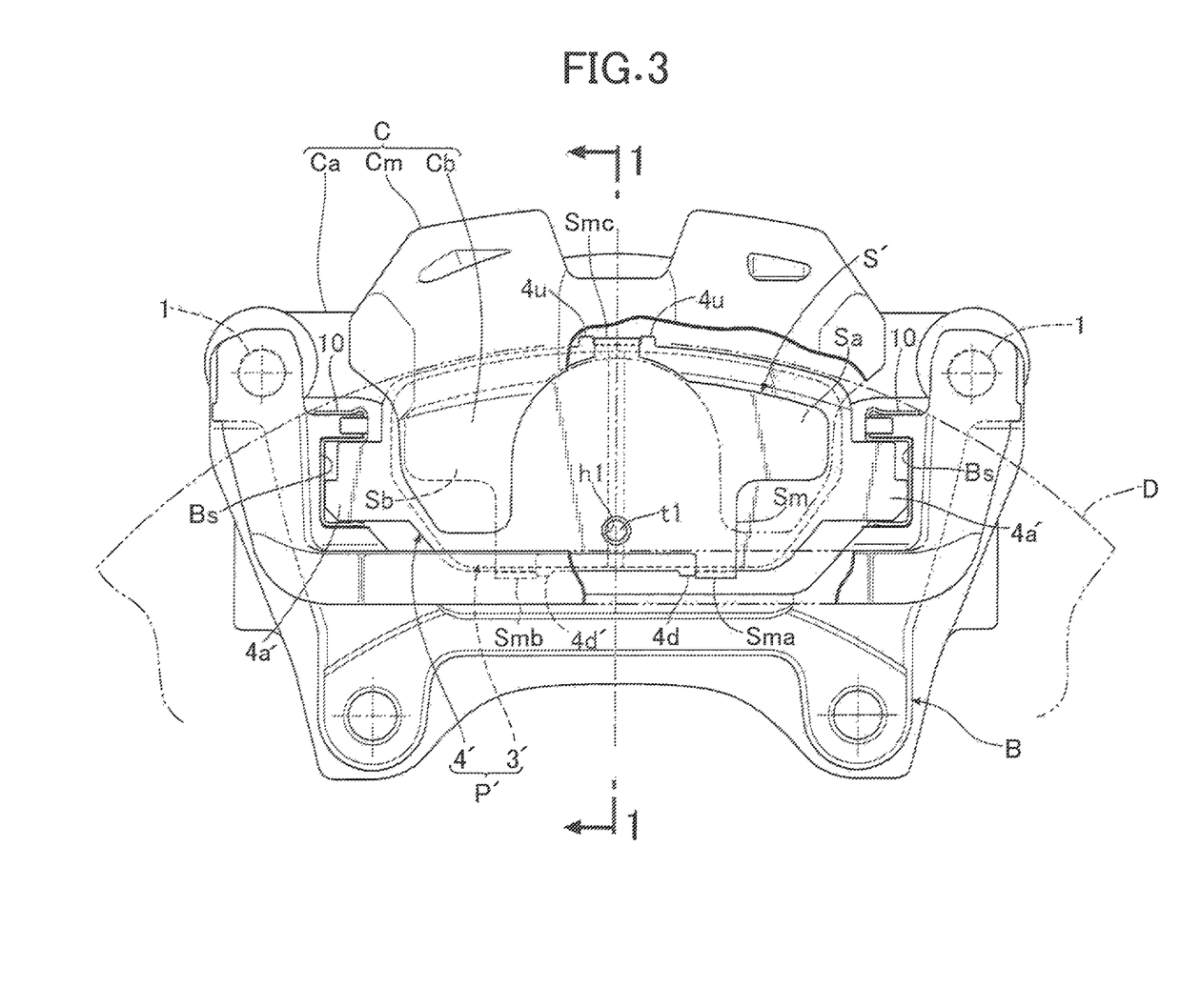
FIG. 3 is a partially-broken side view illustrating the disc brake device seen from a second arm section (seen from arrow 3 in FIG. 1). (First embodiment)
Figure 4:
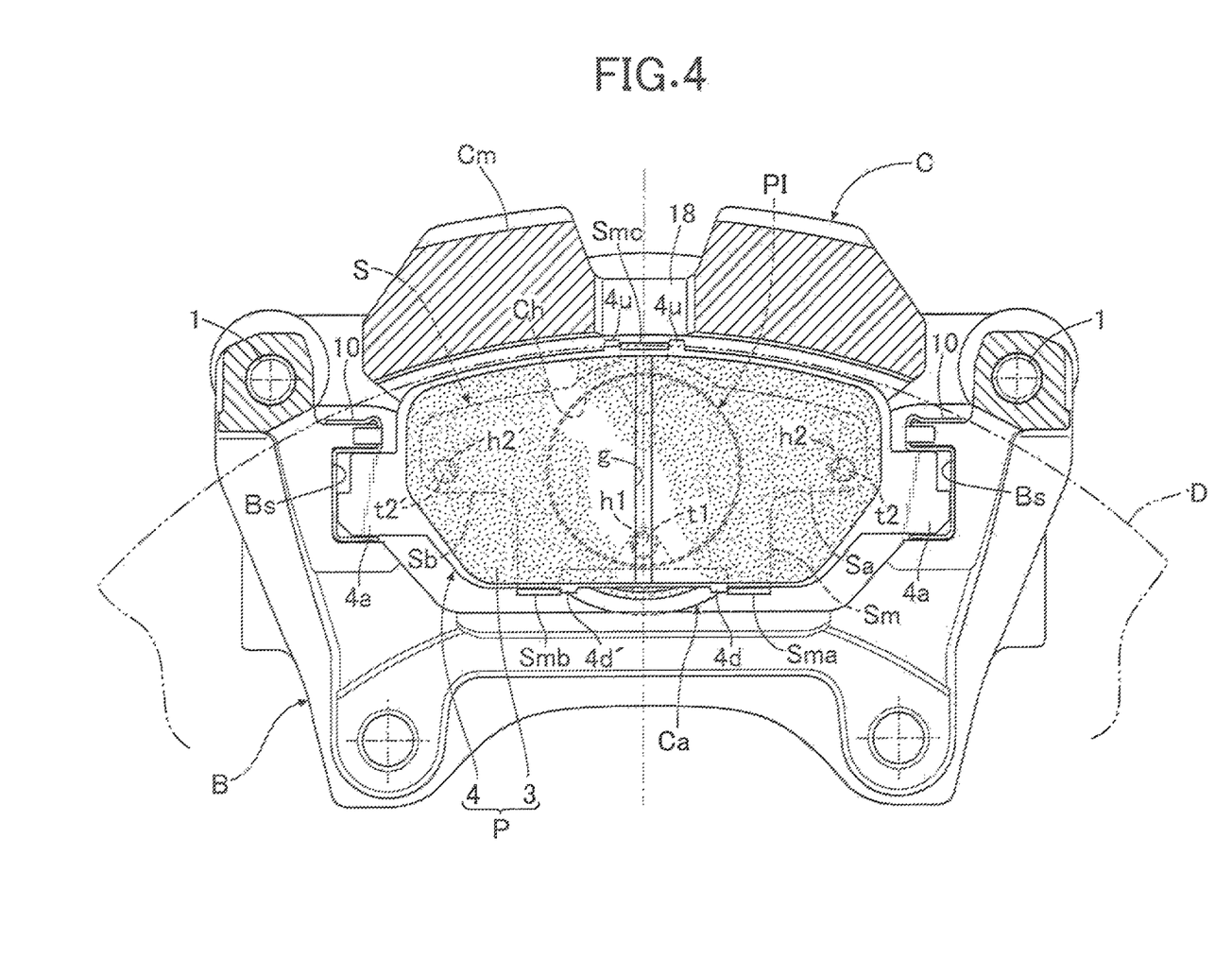
FIG. 4 is a cross sectional view taken along line 4-4 in FIG. 1. (First embodiment)

A pair of slide pins 1 and 1, extending in parallel to the axial line of the brake disc D, that is fixed to both end parts in the disc circumferential direction is slidably supported by a pin hole Ba of the brake bracket B, and boots 2 and 2 surrounding the exposed parts of both slide pins 1 and 1 are provided between the first arm section Ca and the brake bracket B. In addition, the intermediate bridge part Cm is provided with an inspection window 18 through which the wear condition of the friction pads P and P' or the like is visually inspected.

Figure 7:
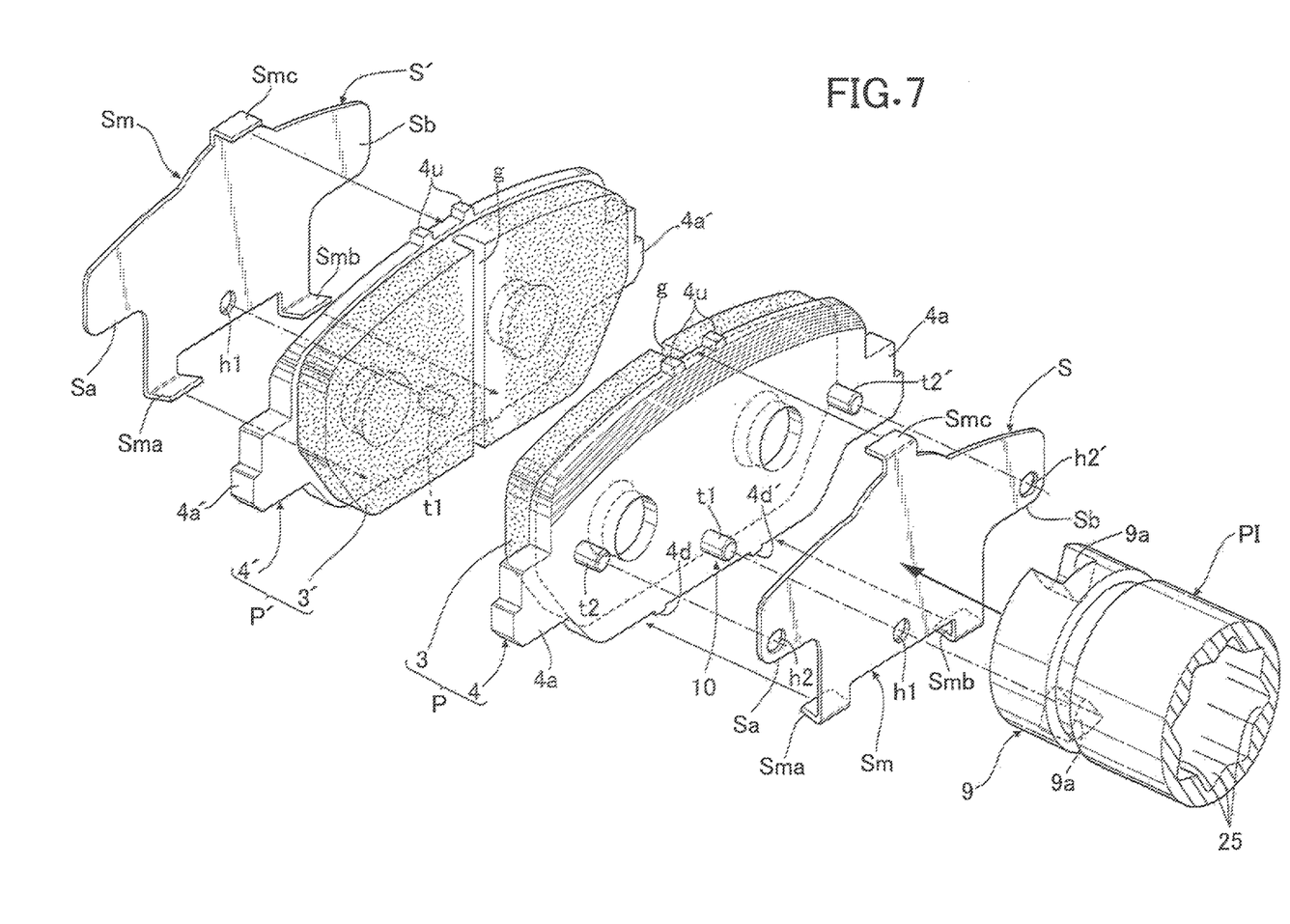
FIG. 7 is an exploded perspective view illustrating first and second friction pads and peripheral components thereof. (First embodiment)

A first friction pad P facing one side surface of the brake disc D on the first arm section Ca side (that is, on the action part side) is configured by providing a lining 3 capable of generating a friction force when making slidable contact with the brake disc D on a back plate 4 made of metal. In addition, a second friction pad P' facing the other side surface of the brake disc D on the second arm section Cb side (that is, the reaction part side) is configured by providing a lining 3' capable of generating a friction force when making slidable contact with the brake disc D on the back plate 4' made of metal. Although the contact surfaces of the linings 3 and 3' that make contact with the brake disc D are provided with recessed grooves g extending in the disc radial direction in the example illustrated in the drawing, these recessed grooves g may be omitted as needed.

The linings 3 and 3' of both friction pads P and P' extend in the circumferential direction of the brake disc D and the end parts 4a and 4a and the end parts 4a' and 4a' of the back plates 4 and 4' extend ahead of the linings 3 and 3' in the circumferential direction of the brake disc D. The end parts 4a and 4a and the end parts 4a' and 4a' of the back plates 4 and 4' are fitted into support grooves Bs and Bs provided in the brake bracket B so as to be slidable only in the direction along the axial line of the brake disc D and not to be rotatable relatively via the guide plate 10. Therefore, both friction pads P and P' are held in the brake bracket B so as to be movable only along the axial line of the brake disc D.

The first arm section Ca of the brake caliper C is provided with a bottomed cylinder hole Ch that has an axial line O parallel to the axial line of the brake disc D, is opened to the first friction pad P, and has a closed end on the opposite side, and the first arm section Ca has a circular cross section. The center of a bottom wall 5 of the cylinder hole Ch is provided with a bearing hole 5a through which a working shaft 6 of an electric actuator A, which will be described later, passes rotatably and a seal member 7 is present between the bearing hole 5a and the working shaft 6 to seal the gap thereof.

A bottomed cylindrical piston PI having the closed front end is fitted into the cylinder hole Ch so that a front end wall 9 thereof makes contact with the back plate 4 of the first friction pad P with a shim plate S sandwiched therebetween and a fluid-hydraulic chamber 8 as a hydraulic chamber is defined between the back surface of the piston PI and the bottom wall 5. In addition, although the rotation limitation means 10 for preventing the piston PI from rotating in the cylinder hole Ch is present between the front end wall 9 of the piston PI and the back plate 4 of the first friction pad P, the specific structure will be described later.

As illustrated in FIG. 7, the shim plate S superimposed on the back surface of the first friction pad P has a shim main body Sm formed in a substantially rectangle slightly wider in the disc circumferential direction and the disc radial direction than the piston PI and a pair of extension portions Sa and Sb extending from both ends in the disc circumferential direction of the shim main body Sm and the shim plate S is formed in a substantially T-shape as a whole.

The side edge part inward in the disc radial direction of the shim main body Sm is integrally provided with a pair of lower locking claws Sma and Smb elastically locked to the lower part of the back plates 4 and 4' of the friction pads P and P' in positions separated from each other in the disc circumferential direction and the center of the side edge part outward in the disc radial direction of the shim main body Sm is integrally provided with a single upper locking claw Smc elastically locked to the upper parts of the back plates 4 and 4' of the friction pads P and P'. Therefore, when these locking claws Sma, Smb, and Smc are provided, since the locking claws elastically make contact and are locked to the back plates 4 and 4', the strength for retaining the shim plate S to the back plates 4 and 4' becomes higher, thereby effectively preventing the shim plate S from being deformed or dropped. It should be noted that the upper parts of the back plates 4 and 4' of the friction pads P and P' are provided with an locking protrusion 4*u* to be locked to the upper locking claw Smc to prevent horizontal deviation and the lower parts of the back plates 4 and 4' are provided with locking protrusions 4*d* and 4*d'* to be locked to the pair of lower locking claw Sma and Smb to prevent horizontal deviation.

By the way, as another embodiment of the invention, for example, as locking claws integrally provided on the shim plate S and elastically locked to the back plates 4 and 4', an embodiment (not illustrated) in which either the lower locking claws Sma and Smb or the upper locking claw Smc is used and the other locking claw or locking claws are omitted is possible and the structure corresponds to the eighth aspect of the invention.

Therefore, according to the other embodiment described above, when one of the above locking claws makes contact with and is locked to the corresponding side edge parts of the back plates 4 and 4' elastically, the strength for retaining the shim plate S to the back plates 4 and 4' can be increased so that deformation or drop of the shim plate S can be effectively prevented and the number of locking claws can be minimized, thereby improving yields during molding of the shim plate S and reducing the cost.

In addition, an annular piston seal 11 mounted between the brake caliper C and the piston PI is attached to the inner surface of the cylinder hole Ch and an annular dust boot 12 is provided between the opening end part of the cylinder hole Ch and the piston PI. In addition, the first arm section Ca is provided with a fluid-hydraulic port 13 for introducing the fluid-hydraulic pressure to the fluid-hydraulic chamber 8 and the output side of the master cylinder (not illustrated) is connected to the external opening end of the fluid-hydraulic port 13 via a fluid-hydraulic introduction pipe 14. It should be noted that the reference numeral 15 indicates a plug detachably mounted to the first arm section Ca to release air in the fluid-hydraulic chamber 8 in FIG. 2.

Therefore, when the braking fluid-hydraulic pressure output from the master cylinder according to the driver's braking operation is introduced to the fluid-hydraulic chamber 8 of the first arm section Ca of the brake caliper C, the introduced fluid-hydraulic pressure moves the piston PI forward and press-fits the first friction pad P to one side of the brake disc D, the reaction force presses the second arm section Cb of the brake caliper C against the second friction pad P', and the second friction pad P' is press-fitted to the other side surface of the brake disc D. This applies the braking force from both friction pads P and P' to the brake disc D (therefore, wheels). This operation principle is the same as the conventional well-known disc brake.

By the way, the embodiment has, as pressing means for the piston PI, independent electric pressing means separately from the pressing means of the fluid-hydraulic described above and the latter pressing means constitutes the pressing means of the invention. In the embodiment, the electric actuator A, which will be described in details below, is used as the latter pressing means.

This electric actuator A includes the electric motor M capable of generating a driving force when energized, the working shaft 6 rotated and driven via a deceleration mechanism (not illustrated) by the electric motor M, and the motion conversion mechanism T disposed in the fluid-hydraulic chamber 8 to convert the rotary motion of the working shaft 6 to the straight (forward) motion of the piston PI. The motor case of the electric motor M is coupled to the external end part of the first arm section Ca and the deceleration mechanism is housed in the case.

In addition, the motion conversion mechanism T includes a male screw part 6*a* formed on the part of the outer periphery present in the fluid-hydraulic chamber 8, a nut member 21 screwed with the male screw part 6*a*, and locking grooves 25 formed on the inner circumferential surface of the piston PI so as to fit the outer circumferential part of the nut member 21 slidably in the axial direction and relatively unrotatably. The nut member 21 includes an engagement part 21*a* having a square outer periphery at the front end and the front end surface of the engagement part 21*a* makes contact with the inner surface of the front end wall 9 of the piston PI. An outward collar part 6*f* integrally protrudes from the outer periphery of the middle part of the working shaft 6 so as to face the surface facing the fluid-hydraulic chamber 8 of the bottom wall 5 and a thrust bearing 22 and a washer 23 are present between the collar part 6*f* and the bottom wall 5.

Figure 5:
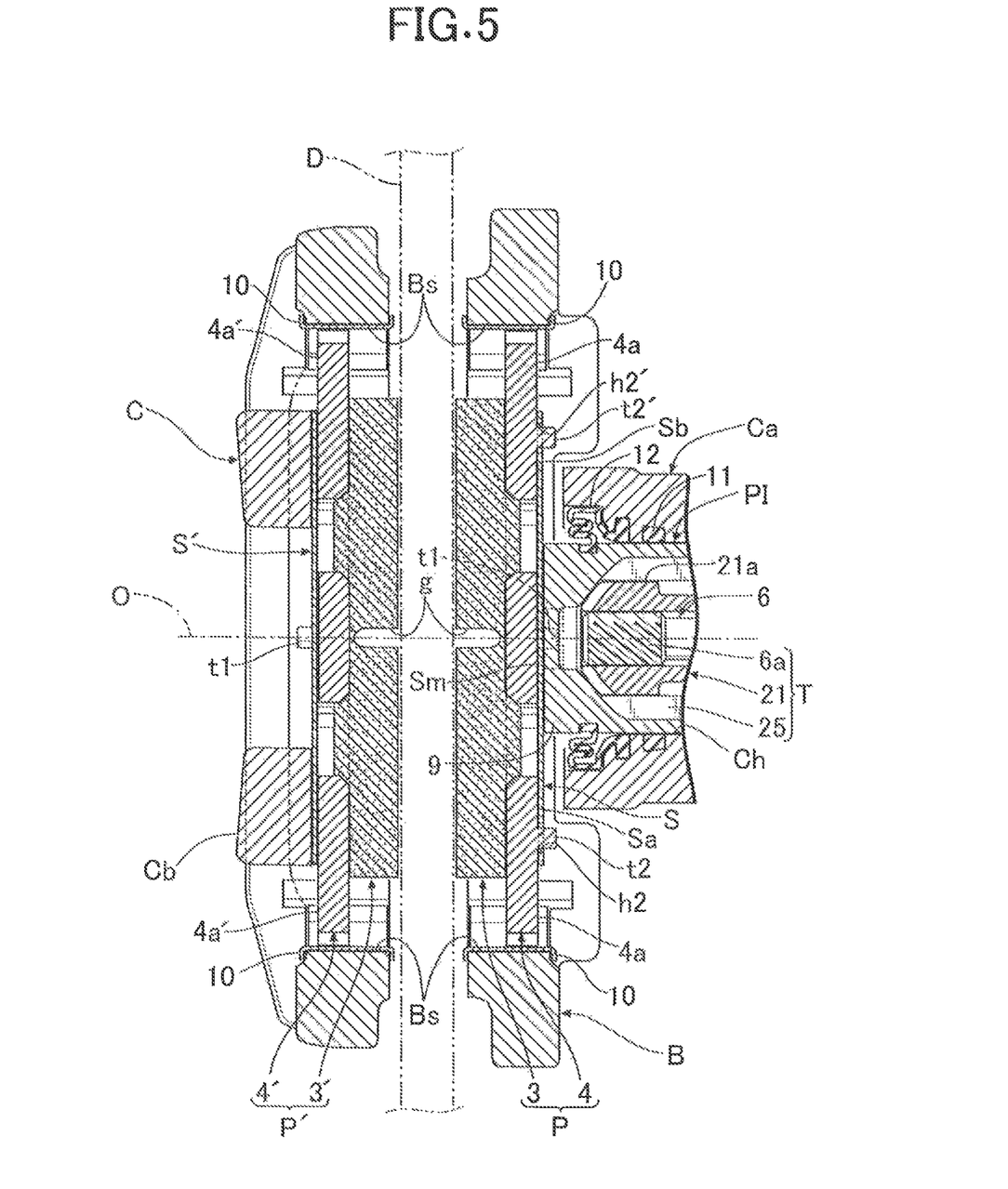
FIG. 5 is a cross sectional view taken along line 5-5 in FIG. 1. (First embodiment)
Figure 6:
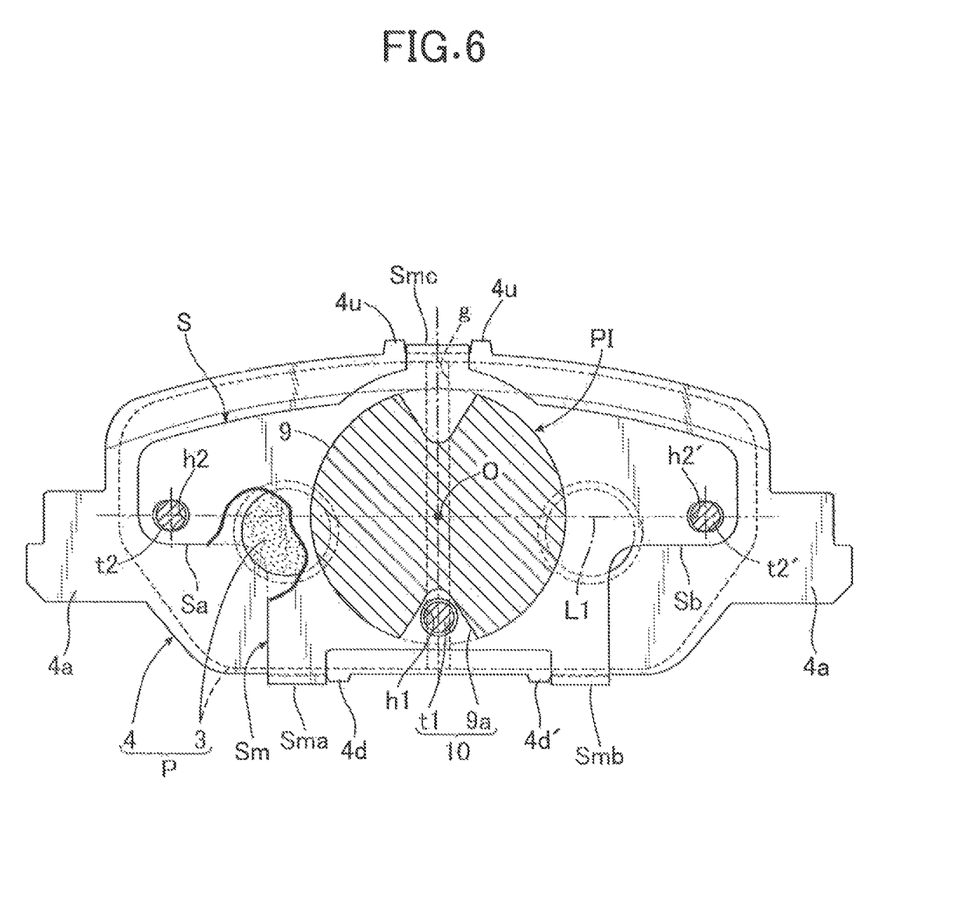
FIG. 6 is a cross sectional view taken along line 6-6 in FIG. 1. (First embodiment)

On the other hand, a number of locking grooves 25 equal to a integral multiple (twice in the embodiment) of four corners of the engagement part 21*a* is provided at regular intervals in the circumferential direction while extending in the axial direction so that the corners are selectively fitted into the locking grooves 25 in positions having different phases in the circumferential direction on the inner circumference of the piston PI, which is a bottomed cylinder. That is, the inner circumference of the piston PI corresponds to the shape of the outer circumference of the engagement part 21*a* and is formed in a shape obtained by superimposing a plurality of regular polygons having different phases from each other and the inner circumference is formed in a star shape obtained by superimposing two squares having different phases deviating 45 degrees each other.

In the motion conversion mechanism T described above, when a rotary driving force in one direction is transferred from the motor output side to the working shaft 6 due to energization of the electric motor M, the rotational force of the working shaft 6 is converted to a forward driving force for the piston PI in the state in which relative rotation between the piston PI and the nut member 21 is blocked. Accordingly, as in the case in which the fluid-hydraulic pressure is introduced to the fluid-hydraulic chamber 8 described above, the brake disc D is clamped from both sides by the friction pads P and P' due to an action for sliding the piston PI forward in the axial direction and a reaction thereof, thereby generating a braking force.

In addition, when a rotary driving force in another direction is transferred from the motor output side to the working shaft 6 due to switching of energization to the electric motor M, the rotational force of the working shaft 6 is converted to a backward driving force for the piston PI in the state in which relative rotation between the piston PI and the nut member 21 is blocked, thereby sliding the piston PI backward in the axial direction and releasing the braking state.

By the way, to accurately convert the rotation of the working shaft 6 to the forward motion of the piston PI in the motion conversion mechanism T when the electric actuator A operates, the rotation of the piston PI in the cylinder hole Ch needs to be restricted. The rotation limitation means 10 for this purpose is provided between the piston PI and the back plate 4 of the first friction pad P that is supported while being prevented from rotating by the support grooves Bs of the brake bracket B.

That is, a first protrusion t1 protruding toward the piston PI is integrally provided in the middle of the lower part of the back plate 4 of the first friction pad P that faces the piston PI with the shim plate S sandwiched therebetween. In contrast, the shim plate S is provided with a first engaging hole h1 into which the first protrusion t1 is fitted, the front surface of the front end wall 9 of the piston PI is provided with a pair of engaging grooves 9a arranged in a straight line. The first protrusion t1 is fitted into one of the engaging grooves 9a to restrict the rotation of the piston PI in the cylinder hole Ch. Therefore, the rotation limitation means 10 is configured by the engaging groove 9a and the first protrusion t1.

In addition, the back plate 4 of the first friction pad P is provided with the plurality of (two in the example in the drawing) second protrusions t2 and t2', protruding toward the piston PI, that is spaced apart from each other at regular intervals. In contrast, the shim plate S is provided with the plurality of (two in the example in the drawing) second engaging holes h2 and h2' into which the second protrusions t2 and t2' are fitted, respectively. By fitting the second protrusions t2 and t2' into the second engaging holes h2 and h2', the shim plate S is surely prevented from being co-rotated with the piston PI by a large rotary reaction force applied from the motion conversion mechanism T to the piston PI when the electric actuator A operates.

As described above, the shim plate S has the pair of extension portions Sa and Sb extending from both ends in the disc circumferential direction of the shim main body Sm and the end parts of the extension portions Sa and Sb, that is, both end parts in the longitudinal direction of the shim plate S are provided with the second engaging holes h2 and h2', respectively.

The second engaging holes h2 and h2' are disposed on one side and the other side with the cylinder hole Ch sandwiched therebetween in a virtual line L1 passing through the axial line O of the cylinder hole Ch and extending along the disc circumferential direction as seen from the projection plane orthogonal to the rotational shaft line of the brake disc D. The second engaging holes h2 and h2' are formed in long holes having longer axes along the disc circumferential direction (that is, the direction in which the virtual line L1 extends) and the inner diameter along the shorter axis of the long holes is substantially the same length as the outer diameter of the second protrusions t2 and t2', corresponding to the long holes, that has circular cross sections.

Therefore, although the pair of second protrusions t2 and t2' is disposed line-symmetrically with respect to the symmetric axis that is the straight line along the disc radial direction passing through the axial line O of the cylinder hole Ch as seen from the projection plane and the pair of second engaging holes h2 and h2' is also disposed line-symmetrically with respect to the symmetric axis that is the straight line in the embodiment, the pair of second protrusions t2 and t2' and the pair of second engaging holes h2 and h2' do not necessarily need to be disposed line-symmetrically as described above.

Although the shim plate S' present between the back surface of the second friction pad P' and the second arm section Cb basically has the same structure as the shim plate S close to the first friction pad P described above, the back plate 4' of the second friction pad P' is not provided with the second protrusions t2 and t2' and the shim plate S' is not provided with the second engaging holes h2 and h2'.

Next, effects of the embodiment will be described. In the disc brake device according to the embodiment, when the vehicle in the traveling state is braked, a braking fluid-hydraulic pressure is introduced from the master cylinder (not illustrated) to the fluid-hydraulic chamber 8 according to a braking operation, the piston PI is driven forward by the introduced fluid-hydraulic pressure, and braking effects can be obtained by clamping the brake disc D between both friction pads P and P'. In addition to the normal service brake operation as described above, the disc brake can be function as a parking brake.

That is, when the vehicle is parked, the electric actuator A is energized in response to the parking instruction to operate the electric motor M, the rotational force of the motor M is converted to a forward driving force for the piston PI by the motion conversion mechanism T, and the brake disc D is clamped between both friction pads P and P' to obtain the parking brake state.

In the operational state of the electric actuator A as described above, the piston PI receives a large rotary reaction force when the rotational force of the electric motor M is converted to a forward thrust for the piston PI in the motion conversion mechanism T. In contrast, although the piston PI is fitted via the rotation limitation means 10 into the first friction pad P that is prevented from being rotated by the brake bracket B, since the fitting part (that is, the fitting part between the first protrusion t1 and the engaging groove 9a) has a little play clearance, the piston PI tries to rotate within the play clearance range and, at that time, tries to rotate (that is, co-rotate the shim plate S with the piston PI) the shim plate S in close contact with the front surface of the piston PI in the same direction.

However, in the embodiment, the back plate 4 of the first friction pad P facing the piston PI with the shim plate S sandwiched therebetween is provided with the plurality of second protrusions t2 and t2' protruding toward the piston PI, the protrusions t2 and t2' being spaced apart from each other, and the shim plate S is provided with the plurality of second engaging holes h2 and h2' into which the plurality of second protrusions t2 and t2' is fitted to prevent the shim plate S from being co-rotated with the piston PI by the rotational force of the electric actuator A. That is, even when a large rotational force is applied to the piston PI as pressurization by the electric actuator A is activated, it is possible to surely prevent the shim plate S from being co-rotated (from being relatively rotated with respect to the back plate 4) with the piston PI by the fitting protrusions t2 and t2' into the engaging holes h2 and h2', individual components (for example, the locking claws Sma, Smb, and Smc locking to the pad back plate 4 and the contact surface in contact with the pad back plate 4) of the shim plate S are not excessively loaded, thereby contributing to the improvement of the durability of the shim plate S.

Particularly in the embodiment, the shim plate S extends to one side and the other side in the disc circumferential direction from the cylinder hole Ch as seen from the projection plane orthogonal to the rotational shaft line of the brake disc D and at least one (one in the example in the drawing) second engaging hole h2 and at least the other (one in the example in the drawing) second engaging hole h2' are disposed separately on one side and the other side in the disc circumferential direction as seen from the projection plane with the cylinder hole Ch sandwiched therebetween. Accordingly, the plurality of the second engaging holes h2 and h2' (therefore, the plurality of second protrusions t2 and t2') can be disposed using the wide extending regions (that is, the extension portions Sa and Sb described above) of the sim plates extending toward both sides of the cylinder hole Ch in the disc circumferential direction at relatively high flexibility and the plurality of protrusions t2 and t2' can be fitted into the plurality of engaging holes h2 and h2' in positions separated in the disc circumferential direction from the axial line O of the cylinder hole Ch, thereby effectively preventing the shim plate S from being co-rotated with the piston PI.

In addition, the second engaging holes h2 and h2' are formed in long holes having longer axes along the disc circumferential direction in the embodiment, and the inner diameters along shorter axes of the long holes h2, h2' are substantially the same length as the outer diameters of the second protrusions t2 and t2' having circular cross sections. Accordingly, by relatively sliding the second protrusions t2 and t2' in the longitudinal direction of the second engaging holes h2 and h2' while surely preventing the shim plate S from being co-rotated with the piston P by fitting the second protrusions t2 and t2' into the second engaging holes h2 and h2' formed into the long holes, it is possible to affordably absorb the tolerance in the dimensions of the pad back plate 4 and the shim plate S in the same direction along the longitudinal direction and to perform assembly work accurately.

In addition, since the second engaging holes h2 and h2' are formed in the end parts of the extending regions (that is, the extension portions Sa and Sb) of the shim plate S, the engaging holes h2 and h2' (therefore, the protrusions t2 and t2') can be disposed in both end parts in the longitudinal direction of the shim plate S sufficiently separated from the axial line O of the cylinder hole Ch in the disc circumferential direction, thereby more effectively preventing the shim plate S from being co-rotated.

Although an embodiment of the invention has been described above, the invention is not limited to the above embodiment and various modifications may be made without departing from the spirit of the invention.

For example, although the electric actuator A as the pressing means is used as the pressing means for a parking brake in the embodiment, the invention is not limited to the embodiment and the electric actuator A may be used as the pressing means for a brake for holding wheels in the stationary state when a temporary stop (for example, a stop in the idling stop state) is made during a normal travel, in addition to a parking brake. Alternatively, the electric actuator may be used as the pressing means for a normal service brake for braking of a travelling vehicle.

In addition, although the second engaging holes h2 and h2' are disposed separately on one side and the other side with the cylinder hole Ch sandwiched therebetween in a virtual line L1 passing through the axial line O of the cylinder hole Ch and extending along the disc circumferential direction as seen from the projection plane orthogonal to the rotational shaft line of the brake disc D in the embodiment, the second protrusions t2 and t2' and the second engaging holes h2 and h2' may deviate from the virtual line L1 in another embodiment of the invention.

For example, the second protrusions t2 and t2' and the second engaging holes h2 and h2' may be distributed to one side and the other side with the cylinder hole Ch sandwiched therebetween in one diameter line inclined with respect to the disc circumferential direction of the cylinder hole Ch as seen from the projection plane. In this case, when the second engaging holes h2 and h2' are formed in long holes having longer axes along the one diameter line and the inner diameter along (along the direction orthogonal to the one diameter line) shorter axes of the long holes is substantially the same length as the outer diameter of the second protrusions t2 and t2' having circular cross sections, it is possible to achieve effects of affordably absorbing the tolerance in the dimensions of the pad back plate 4 and the shim plate S along the one diameter line while surely preventing the shim plate S from being co-rotated with the piston P.

In addition, for example, the second protrusions t2 and t2' and the second engaging holes h2 and h2' may be disposed in positions deviating from the one diameter line as seen from the projection plane. In this case, the second engaging holes h2 and h2' only need to be formed in long holes having longer axes along the straight line connecting the axial line O of the cylinder hole Ch to the second protrusions t2 and t2' as seen from the projection plane.

Although the second engaging holes h2 and h2' are formed in long holes in the embodiment, the second engaging holes h2 and h2' do not necessarily need to be formed in long holes in the invention. For example, even when the second engaging holes h2 and h2' are formed to have an inner diameter substantially the same length as (or slightly larger than) the outer diameter of the second protrusions t2 and t2', it is possible to prevent the shim plate S from being co-rotated with the piston PI by fitting the second protrusions t2 and t2' into the second engaging holes h2 and h2'.

Although predetermined play is set between the first protrusion t1 of the pad back plate 4 and the first engaging hole h1 of the shim plate S in the embodiment, this play may be set to a smaller value or zero. Particularly when the play is set to zero or a very small value, the first protrusion t1 and the first engaging hole h1 are included one of the plurality of protrusions and the plurality of engaging holes in the invention.

Although predetermined play is set between the engaging groove 9a of a piston front end wall 9 and the first protrusion t1 of the pad back plate 4 in the embodiment, this play may be set to a smaller value or zero.

The invention claimed is:

1. A disc brake device for a vehicle, the disc brake device comprising:
   a brake disc;
   a pair of friction pads facing each other with the brake disc sandwiched therebetween;
   a brake caliper that has a pair of arm sections disposed on back sides of the friction pads and is slidably supported by a fixed bracket;
   a piston that is slidably fitted into a cylinder hole provided in one of the arm sections of the brake caliper and is capable of pressing one of the friction pads, said piston having an engaging groove formed therein;
   a shim plate that is attached to a back plate of the one of the friction pads and is present between the back plate and the piston; and
   a pressing device capable of giving a pressing force to the piston while applying a rotational force to the piston, wherein the back plate facing the piston with the shim plate sandwiched therebetween is provided integrally with a first protrusion and a plurality of second protrusions protruding toward the piston, the second protrusions being spaced apart from each other and the shim plate is provided with a plurality of engaging holes into which the plurality of second protrusions is fitted to prevent the shim plate from being co-rotated with the piston by the rotational force;

wherein the first protrusion is arranged between the second protrusions and is engaged with the engaging groove.

2. The disc brake device for a vehicle according to claim 1, wherein the shim plate extends to one side and the other side in a circumferential direction of the brake disc from the cylinder hole as seen from a projection plane orthogonal to a rotational shaft line of the brake disc, and at least one of the engaging holes and at least the other of the engaging holes are disposed on one side and the other side, respectively, in the circumferential direction of the brake disc as seen from the projection plane with the cylinder hole sandwiched therebetween.

3. The disc brake device for a vehicle according to claim 2, wherein the at least one of the engaging holes is formed as a long hole having a longer axis along a straight line connecting an axial line of the cylinder hole and the second protrusions as seen from the projection plane and an inner diameter along a shorter axis of the long hole is substantially the same length as an outer diameter of the second protrusions to be fitted into the long hole.

4. The disc brake device for a vehicle according to claim 3, wherein the at least one of the engaging holes is formed in an end part on the one side in the circumferential direction of the brake disc in the shim plate and the at least the other of the engaging holes is formed in an end part on the other side in the circumferential direction of the brake disc in the shim plate.

5. The disc brake device for a vehicle according to claim 2, wherein the at least one of the engaging holes is formed in an end part on the one side in the circumferential direction of the brake disc in the shim plate and the at least the other of the engaging holes is formed in an end part on the other side in the circumferential direction of the brake disc in the shim plate.

6. The disc brake device for a vehicle according to claim 1, wherein at least one of the engaging holes and at least the other of the engaging holes are disposed on one side and the other side, respectively, in one diameter line of the cylinder hole with the cylinder hole sandwiched therebetween as seen from a projection plane orthogonal to a rotational shaft line of the brake disc.

7. The disc brake device for a vehicle according to claim 6, wherein at least one of the engaging holes is formed as a long hole having a longer axis along the one diameter line and an inner diameter along a shorter axis of the long hole is substantially the same length as an outer diameter of the second protrusions to be fitted into the long hole.

8. The disc brake device for a vehicle according to claim 1, wherein the pressing device is an electric actuator capable of generating a driving force when energized and a hydraulic chamber to which a hydraulic pressure capable of pressurizing the piston independently from the electric actuator is introducible is defined on a back surface of the piston in the cylinder hole.

9. The disc brake device for a vehicle according to claim 1, wherein a locking claw to be elastically locked to a corresponding side edge part of the back plate is provided integrally in one of a side edge part on a radial inside and a side edge part on a radial outside of the brake disc of the shim plate.

* * * * *